US012739252B2

(12) United States Patent
Alrahem et al.

(10) Patent No.: US 12,739,252 B2
(45) Date of Patent: Sep. 15, 2026

(54) DETERMINING APPROVAL WORKFLOWS FOR OBTAINING APPROVALS TO ACCESS RESOURCES

(71) Applicant: Oracle International Corporation, Redwood Shores, CA (US)

(72) Inventors: Thoulfekar Alrahem, Bend, OR (US); Girish Nagaraja, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 18/640,885

(22) Filed: Apr. 19, 2024

(65) Prior Publication Data

US 2025/0184329 A1 Jun. 5, 2025

Related U.S. Application Data

(63) Continuation-in-part of application No. 18/529,558, filed on Dec. 5, 2023.

(51) Int. Cl.
*H04L 9/40* (2022.01)

(52) U.S. Cl.
CPC .................................... *H04L 63/10* (2013.01)

(58) Field of Classification Search
CPC ....................................................... H04L 63/10
See application file for complete search history.

(56) References Cited

U.S. PATENT DOCUMENTS 8,504,443 B2 8/2013 Ferris et al.
8,898,763 B1 11/2014 Mannepalli et al.
8,959,221 B2 2/2015 Morgan
(Continued)

FOREIGN PATENT DOCUMENTS

CN 108696496 A * 10/2018 ......... G06F 21/6218
DE 112021005656 T5 * 8/2023 ............. H04L 41/22
(Continued)

OTHER PUBLICATIONS

"IBM SmartCloud: Becoming a Cloud Service Provider", IBM, Dec. 13, 2012, <https://www.redbooks.ibm.com/ abstracts/redp4912.html> (Year: 2012).

(Continued)

*Primary Examiner* — Michael R Vaughan
(74) *Attorney, Agent, or Firm* — Invoke

(57) ABSTRACT

A system receives an approval request from an access agent for the system to request an approval for the access agent to access the first resource. The system determines, based on a dependency attribute associated with the first resource, a resource dependency between the first resource and a second resource. The system generates, based at least in part on the resource dependency between the first resource and the second resource, an approval requisition for requesting the approval to access the first resource based on an approval workflow corresponding to the second resource. The system traverses the approval workflow corresponding to the second resource to obtain, based on the approval requisition, the approval to access the first resource. Upon obtaining the approval to access the first resource, the access agent accesses the first resource based at least in part on the approval.

20 Claims, 10 Drawing Sheets

(56) References Cited

U.S. PATENT DOCUMENTS 9,092,502 B1 7/2015 Cannaliato et al.
9,100,424 B1 8/2015 Thomas
9,137,093 B1 9/2015 Abraham et al.
9,160,749 B2 10/2015 Subramanian et al.
9,164,864 B1 10/2015 Novick et al.
9,306,814 B1 4/2016 Roth et al.
9,438,599 B1 9/2016 Yuhan et al.
9,553,787 B1 1/2017 Stickle et al.
9,571,516 B1 2/2017 Curcic et al.
9,722,895 B1 8/2017 Sarukkai et al.
9,985,947 B1 5/2018 Elhard
10,198,756 B2 2/2019 Van Erlach
10,237,149 B1 3/2019 Guo et al.
10,394,638 B1 8/2019 Lay et al.
10,496,306 B1 12/2019 Srivastava et al.
10,757,574 B1 8/2020 Rule et al.
10,819,594 B2 10/2020 Margalit et al.
10,878,483 B1 12/2020 Felbinger et al.
10,977,377 B2 4/2021 Roth et al.
10,992,540 B1 4/2021 Kandaswamy et al.
11,070,492 B2 7/2021 Kostov et al.
11,240,110 B1 2/2022 Narula et al.
11,252,157 B1* 2/2022 Khanna ................ G06F 9/5005
11,360,821 B1 6/2022 Dey et al.
11,436,012 B1 9/2022 Narayan
11,537,627 B1 12/2022 Baskaran et al.
11,552,953 B1 1/2023 Avadhanam
11,720,536 B1 8/2023 Kisser et al.
11,765,244 B1 9/2023 Barclay et al.
11,943,385 B1 3/2024 Kumar et al.
12,028,274 B1 7/2024 Krishnaiah et al.
12,373,252 B1 7/2025 Faust et al.
12,412,103 B1 9/2025 Chen et al.
12,493,901 B2 12/2025 Gallagher et al.
2002/0198973 A1 12/2002 Besaw
2003/0135593 A1 7/2003 Lee et al.
2003/0154407 A1 8/2003 Kato et al.
2006/0236381 A1* 10/2006 Weeden ................ H04L 63/101
726/6
2006/0259833 A1 11/2006 Swoboda et al.
2007/0168531 A1 7/2007 Sitaraman et al.
2008/0295095 A1 11/2008 Watanabe et al.
2010/0212004 A1 8/2010 Fu
2011/0055399 A1 3/2011 Tung et al.
2011/0153671 A1* 6/2011 Taniguchi ............ G06F 21/604
707/786
2011/0295727 A1 12/2011 Ferris et al.
2011/0296000 A1 12/2011 Ferris et al.
2012/0117462 A1 5/2012 Jacobson et al.
2012/0124211 A1 5/2012 Kampas et al.
2012/0137001 A1 5/2012 Ferris et al.
2013/0054426 A1 2/2013 Rowland et al.
2013/0124720 A1 5/2013 Wood et al.
2013/0232463 A1* 9/2013 Nagaraja .................. G06F 8/70
717/101
2013/0232480 A1* 9/2013 Winterfeldt .......... G06F 9/5072
717/177
2013/0276142 A1 10/2013 Peddada
2013/0282798 A1 10/2013 Mccarthy et al.
2013/0297711 A1 11/2013 Nhu
2013/0297802 A1 11/2013 Laribi et al.
2013/0304925 A1 11/2013 Ferris et al.
2013/0339515 A1 12/2013 Radhakrishnan
2014/0047064 A1 2/2014 Maturana et al.
2014/0074793 A1 3/2014 Doering et al.
2014/0075034 A1 3/2014 Vasudevan et al.
2014/0089393 A1 3/2014 Druet et al.
2014/0122707 A1 5/2014 De et al.
2014/0156846 A1 6/2014 Stern et al.
2014/0280595 A1 9/2014 Mani et al.
2014/0280948 A1 9/2014 Schmidt et al.
2015/0033086 A1 1/2015 Sasturkar et al.
2015/0089066 A1 3/2015 Meswani et al.
2015/0127531 A1 5/2015 Dimmler et al.
2015/0134485 A1 5/2015 Kim et al.
2015/0180734 A1 6/2015 Maes et al.
2015/0180949 A1 6/2015 Maes et al.
2015/0200824 A1 7/2015 Sadovsky et al.
2015/0200966 A1* 7/2015 Kasturirangan ........ H04L 63/10
726/4
2015/0242262 A1 8/2015 Ranganathan et al.
2015/0350101 A1 12/2015 Sinha et al.
2015/0363852 A1 12/2015 Vautour
2015/0365291 A1 12/2015 Burton et al.
2015/0381526 A1 12/2015 Beaty et al.
2016/0028833 A1 1/2016 Georgieva
2016/0043909 A1 2/2016 Pogrebinsky et al.
2016/0127418 A1 5/2016 Maes et al.
2016/0142211 A1 5/2016 Metke et al.
2016/0142323 A1 5/2016 Lehmann et al.
2016/0203533 A1 7/2016 Cheng et al.
2016/0203544 A1 7/2016 Smits et al.
2016/0253722 A1 9/2016 Johnson et al.
2016/0277411 A1 9/2016 Dani et al.
2016/0323183 A1 11/2016 Jeuk et al.
2016/0337365 A1 11/2016 Beiter
2017/0111331 A1 4/2017 Auradkar et al.
2017/0214632 A1 7/2017 Ravi
2017/0230229 A1 8/2017 Sasturkar et al.
2017/0272336 A1 9/2017 Johnstone et al.
2018/0025403 A1 1/2018 Mckay et al.
2018/0052861 A1 2/2018 Seetharaman et al.
2018/0124105 A1 5/2018 Rodrigues
2018/0197161 A1 7/2018 Kuzkin et al.
2018/0211236 A1 7/2018 Rutherford et al.
2018/0219784 A1 8/2018 Jiang et al.
2018/0232786 A1 8/2018 Kuzkin et al.
2018/0234256 A1 8/2018 Bowen
2018/0287914 A1 10/2018 Gupta
2018/0288135 A1 10/2018 Narayan et al.
2018/0330300 A1 11/2018 Runkana et al.
2019/0036797 A1 1/2019 Margalit et al.
2019/0068495 A1 2/2019 Jeuk et al.
2019/0068622 A1 2/2019 Lin et al.
2019/0075111 A1 3/2019 Mutha et al.
2019/0087835 A1 3/2019 Schwed et al.
2019/0097812 A1 3/2019 Toth
2019/0156000 A1 5/2019 Hoffmann et al.
2019/0166007 A1 5/2019 Sundaram et al.
2019/0205045 A1 7/2019 Hugot et al.
2019/0213104 A1 7/2019 Qadri et al.
2019/0273796 A1 9/2019 Allgeier et al.
2019/0349426 A1 11/2019 Smith et al.
2020/0014659 A1 1/2020 Chasman et al.
2020/0074520 A1 3/2020 Bermudez et al.
2020/0084216 A1 3/2020 North et al.
2020/0112497 A1 4/2020 Yenumulapalli et al.
2020/0117757 A1 4/2020 Yanamandra et al.
2020/0128047 A1 4/2020 Biswas et al.
2020/0134223 A1 4/2020 Ye et al.
2020/0236096 A1 7/2020 Zhu et al.
2020/0274900 A1 8/2020 Vaishnavi
2020/0285496 A1 9/2020 Cropper et al.
2020/0358756 A1 11/2020 Rose et al.
2021/0064431 A1 3/2021 Smith et al.
2021/0067468 A1 3/2021 Cidon et al.
2021/0075870 A1 3/2021 Kempf et al.
2021/0081404 A1 3/2021 Kempf et al.
2021/0103991 A1 4/2021 Kern et al.
2021/0144440 A1 5/2021 Li et al.
2021/0216190 A1 7/2021 Vakil et al.
2021/0224122 A1 7/2021 Glass et al.
2021/0234864 A1 7/2021 Dube et al.
2021/0273914 A1 9/2021 Cobb
2021/0279109 A1 9/2021 Ji et al.
2021/0334375 A1 10/2021 Hu et al.
2021/0377272 A1 12/2021 Dasari et al.
2021/0392142 A1 12/2021 Stephens et al.
2022/0029803 A1 1/2022 Vijayanarayanan
2022/0091947 A1 3/2022 Kothari et al.
2022/0100573 A1 3/2022 Allen
2022/0103618 A1 3/2022 Pinheiro et al.
2022/0116286 A1 4/2022 Doshi et al.
2022/0122097 A1 4/2022 Maugans, III

(56) References Cited

U.S. PATENT DOCUMENTS

2022/0150124 A1 5/2022 Cooley et al.
2022/0150133 A1 5/2022 Dhruvakumar et al.
2022/0191192 A1 6/2022 Drr et al.
2022/0210018 A1 6/2022 Narula et al.
2022/0255902 A1 8/2022 Woodson
2022/0258066 A1 8/2022 Choi et al.
2022/0263835 A1 8/2022 Pieczul et al.
2022/0283926 A1 9/2022 Chirkin et al.
2022/0294818 A1 9/2022 Parekh et al.
2022/0300486 A1 9/2022 Venkateshaiah et al.
2022/0327095 A1 10/2022 Kim et al.
2022/0335340 A1 10/2022 Moustafa et al.
2022/0337578 A1 10/2022 Mankekar et al.
2022/0350675 A1 11/2022 Navali et al.
2022/0350923 A1 11/2022 Kremer et al.
2022/0353266 A1* 11/2022 Ramamurthi ........ G06Q 10/105
2022/0353267 A1* 11/2022 Kundu .................. H04L 63/102
2022/0374271 A1 11/2022 Pogrebinsky et al.
2022/0377111 A1 11/2022 Liao et al.
2022/0382590 A1* 12/2022 Hashimoto ......... H04L 63/0884
2022/0382598 A1 12/2022 Szab et al.
2022/0413956 A1 12/2022 Mathew et al.
2023/0032585 A1 2/2023 Jeuk et al.
2023/0107133 A1 4/2023 Ali et al.
2023/0109926 A1 4/2023 Nair et al.
2023/0126757 A1 4/2023 Roy et al.
2023/0132478 A1 5/2023 Robinson et al.
2023/0179525 A1 6/2023 Pai et al.
2023/0195926 A1 6/2023 Mehta et al.
2023/0222550 A1 7/2023 Huang et al.
2023/0229543 A1 7/2023 Mohanty et al.
2023/0244505 A1 8/2023 Hernandez et al.
2023/0275833 A1 8/2023 Hyun et al.
2023/0281100 A1 9/2023 Wells et al.
2023/0297962 A1* 9/2023 Alabdrabalnabi .. G06F 16/2455 705/7.15
2023/0316348 A1 10/2023 Dageville et al.
2023/0328003 A1 10/2023 Agarwal et al.
2023/0342179 A1 10/2023 Suttle et al.
2023/0362161 A1 11/2023 Spector et al.
2023/0385286 A1 11/2023 Glickman et al.
2023/0386655 A1 11/2023 Kouvaras et al.
2023/0393829 A1 12/2023 Panikkar et al.
2023/0409590 A1 12/2023 Shah et al.
2023/0418979 A1 12/2023 Deluca et al.
2024/0031373 A1 1/2024 Gupta
2024/0054063 A1 2/2024 Wichelman et al.
2024/0061714 A1 2/2024 Pandit et al.
2024/0070735 A1 2/2024 Gallagher et al.
2024/0089722 A1 3/2024 Samanta et al.
2024/0095739 A1 3/2024 Adogla et al.
2024/0098089 A1 3/2024 Adogla et al.
2024/0137339 A1 4/2024 Vemulpali
2024/0152401 A1 5/2024 Naseem
2024/0154992 A1 5/2024 Martin et al.
2024/0160517 A1 5/2024 Fischer et al.
2024/0179146 A1 5/2024 Pinski et al.
2024/0235945 A1 7/2024 Togare
2024/0291729 A1 8/2024 Khan et al.
2024/0320240 A1 9/2024 Podder
2024/0330072 A1 10/2024 Kantamneni et al.
2024/0362130 A1 10/2024 Berg et al.
2024/0362142 A1 10/2024 Berg et al.
2024/0364509 A1* 10/2024 Potlapally ........... H04L 63/0272
2024/0364579 A1 10/2024 Peterson et al.
2024/0364638 A1 10/2024 Peterson et al.
2024/0364690 A1 10/2024 Doherty et al.
2024/0364707 A1 10/2024 Elmenshawy et al.
2024/0386054 A1 11/2024 Wouhaybi et al.
2024/0388512 A1 11/2024 Tesfatsion et al.
2024/0414518 A1 12/2024 Joseph et al.
2024/0422215 A1 12/2024 Khan et al.
2024/0427658 A1 12/2024 Pinahs et al.
2025/0085978 A1 3/2025 R C et al.
2025/0097215 A1 3/2025 Vangpat et al.
2025/0097223 A1 3/2025 Brown et al.
2025/0126028 A1 4/2025 Mohan et al.
2025/0199866 A1 6/2025 Rushton et al.
2025/0322077 A1 10/2025 Panwar et al.
2025/0379830 A1 12/2025 Deowanshi et al.

FOREIGN PATENT DOCUMENTS

EP 2893685 B1 7/2017
EP 3429156 A1 1/2019
EP 3271857 B1 4/2020
KR 10-2014-0066616 A 6/2014
WO 2014/039921 A1 3/2014
WO 2018/010791 A1 1/2018
WO 2021/030220 A1 2/2021
WO 2021/145894 A1 7/2021
WO 2021/150306 A1 7/2021
WO 2021/150307 A1 7/2021
WO 2021/174104 A1 9/2021

OTHER PUBLICATIONS

Anonymous: "Oracle Cloud Infrastructure Documentation—Security Guide for Exadata Database Service on Cloud@Customer Systems", Apr. 1, 2023, XP093181902.

Anonymous: "Oracle Cloud Infrastructure Documentation—Overview of IAM", Feb. 8, 2023, XP093184083.

Anonymous: "Oracle Cloud Infrastructure Documentation—Renaming a Cloud Account", May 14, 2021, XP093185071.

Anonymous: "Oracle Cloud Infrastructure Documentation—Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

Anonymous: "Oracle Cloud Infrastructure Documentation—Getting Started with Policies", Jan. 4, 2023, XP093184099.

Anonymous: "Oracle Cloud Infrastructure Documentation—Getting Summary Information on the Overview Page", Aug. 16, 2022, XP093183031.

Anonymous: "Oracle Cloud Infrastructure Documentation—Learn Best Practices for Setting up Your Tenancy", Feb. 8, 2023, XP093184095.

Anonymous: "Oracle Cloud Infrastructure Documentation—Managing Compartments", Feb. 8, 2023, XP093184098.

Anonymous: "Oracle Cloud Infrastructure Documentation—Monitoring Threats", Sep. 28, 2022, XP093183035.

Anonymous: "Oracle Cloud Infrastructure Documentation—Overview of the Console Dashboards Service", Mar. 14, 2023, XP093184740.

Anonymous: "Oracle Cloud Infrastructure Documentation—Prerequisites for Oracle Platform Services on Oracle Cloud Infrastructure", Mar. 23, 2023, XP093185058.

Anonymous: "Oracle Cloud Infrastructure Documentation—Welcome to Oracle Cloud Infrastructure", Mar. 23, 2023, XP093182493.

Anonymous: "Oracle Gen 2 Exadata Cloud@Customer Security Controls", Jan. 11, 2023, XP093181973.

Anonymous: "Oracle Operator Access Control Configuration and Administration Guide", Nov. 18, 2022, XP093181896.

Anonymous: "Oracle Public Sector Licensing and Permitting", 2022, XP093184298.

Anonymous: "Oracle Sovereign Cloud", Feb. 15, 2023, XP093184649.

Apps2fusion: "Security Roles in Oracle Fusion Cloud SLA", Nov. 30, 2018, XP093184293.

F. John Krautheim ; Private Virtual Infrastructure for Cloud Computing; USENIX:2009; pp. 1-5.

Magouryrk Clay: "Announcing Oracle Alloy: The power of the cloud in your hands", Oct. 18, 2022, XP093183485.

Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

(56) References Cited

OTHER PUBLICATIONS

"Overview of Search", Oracle Cloud Infrastructure Documentation, May 13, 2024, p. 15.
"Overview of Tagging", Oracle Cloud Infrastructure Documentation, Mar. 28, 2024, p. 12.
Anonymbus: "Tokenization—(data security)", Wikipedia, Feb. 12, 2023, pp. 1-12.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.
"General Variables for All Requests", Jun. 28, 2023, pp. 6.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Verbs", Jun. 5, 2023, pp. 2.
"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
"Overview of Access Approval", Retrieved from https://cloud.google.com/assured-workloads/access-approval/docs/overview, Jun. 6, 2024, pp. 5.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
Bhat S., "Admin access management in Azure Cloud Solution Provider (CSP) subscriptions", Retrieved from https://techcommunity.microsoft. com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
N. Katica and A. Tahirovic, "Opportunities for telecom operators in cloud computing business," 2012 Proceedings of the 35th International Convention MIPRO, Opatija, Croatia, 2012, pp. 495-500. (Year: 2012).
"OneBill's Dynamic Billing Software : Rule-based & Events-based Billing", Retrieved from https://www.onebillsoftware.com/dynamic-billing/, Retrieved on Jun. 8, 2026, pp. 1-2.
"Rate Plans", Retrieved from https://help.sap.com/docs/CLOUD_TO_CASH_OD/e4aa21cd43494cc1a8a90ea0f3dab8bb?locale=en-US&state=PRODUCTION&version=2023-12-18, Dec 18, 2023, pp. 1-4.
"ZoneBilling NetSuite Advanced Billing & Revenue Management", Retrieved from https://www.zoneandco.com/billing-management/zonebilling, Retrieved on Dec 20, 2023, pp. 1-9.
Cao et al., "Dynamic Pricing for Resource Consumption in Cloud Service", vol. 2018, Article ID 4263831, May 24, 2018, pp. 1-23.

* cited by examiner

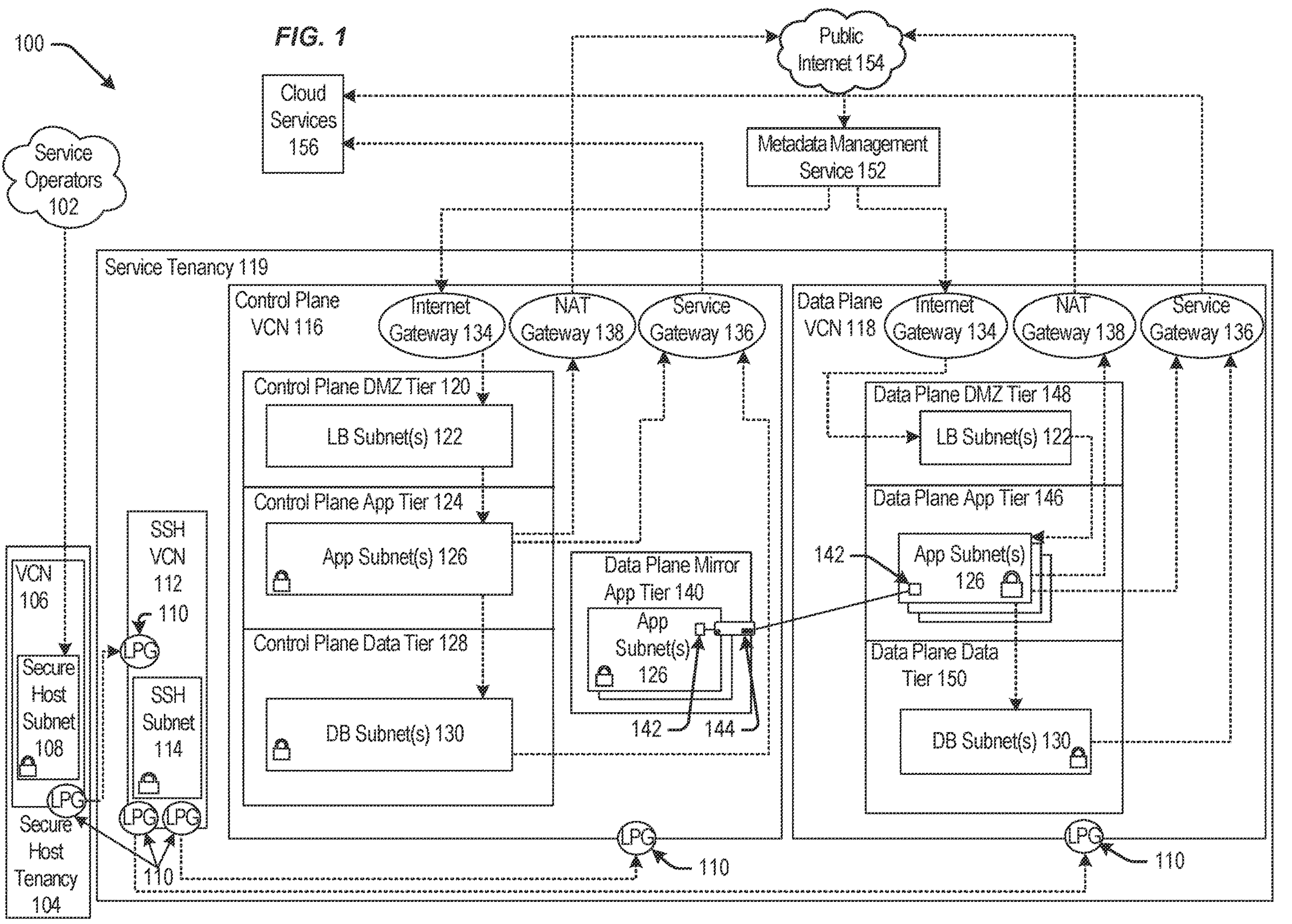
FIG. 1
100
Service Operators 102
Cloud Services 156
Public Internet 154
Metadata Management Service 152
Service Tenancy 119
Control Plane VCN 116
Internet Gateway 134
NAT Gateway 138
Service Gateway 136
Control Plane DMZ Tier 120
LB Subnet(s) 122
Control Plane App Tier 124
App Subnet(s) 126
Control Plane Data Tier 128
DB Subnet(s) 130
Data Plane Mirror App Tier 140
App Subnet(s) 126
142
144
Data Plane VCN 118
Internet Gateway 134
NAT Gateway 138
Service Gateway 136
Data Plane DMZ Tier 148
LB Subnet(s) 122
Data Plane App Tier 146
App Subnet(s) 126
142
Data Plane Data Tier 150
DB Subnet(s) 130
VCN 106
Secure Host Subnet 108
Secure Host Tenancy 104
SSH VCN 112
SSH Subnet 114
LPG
110

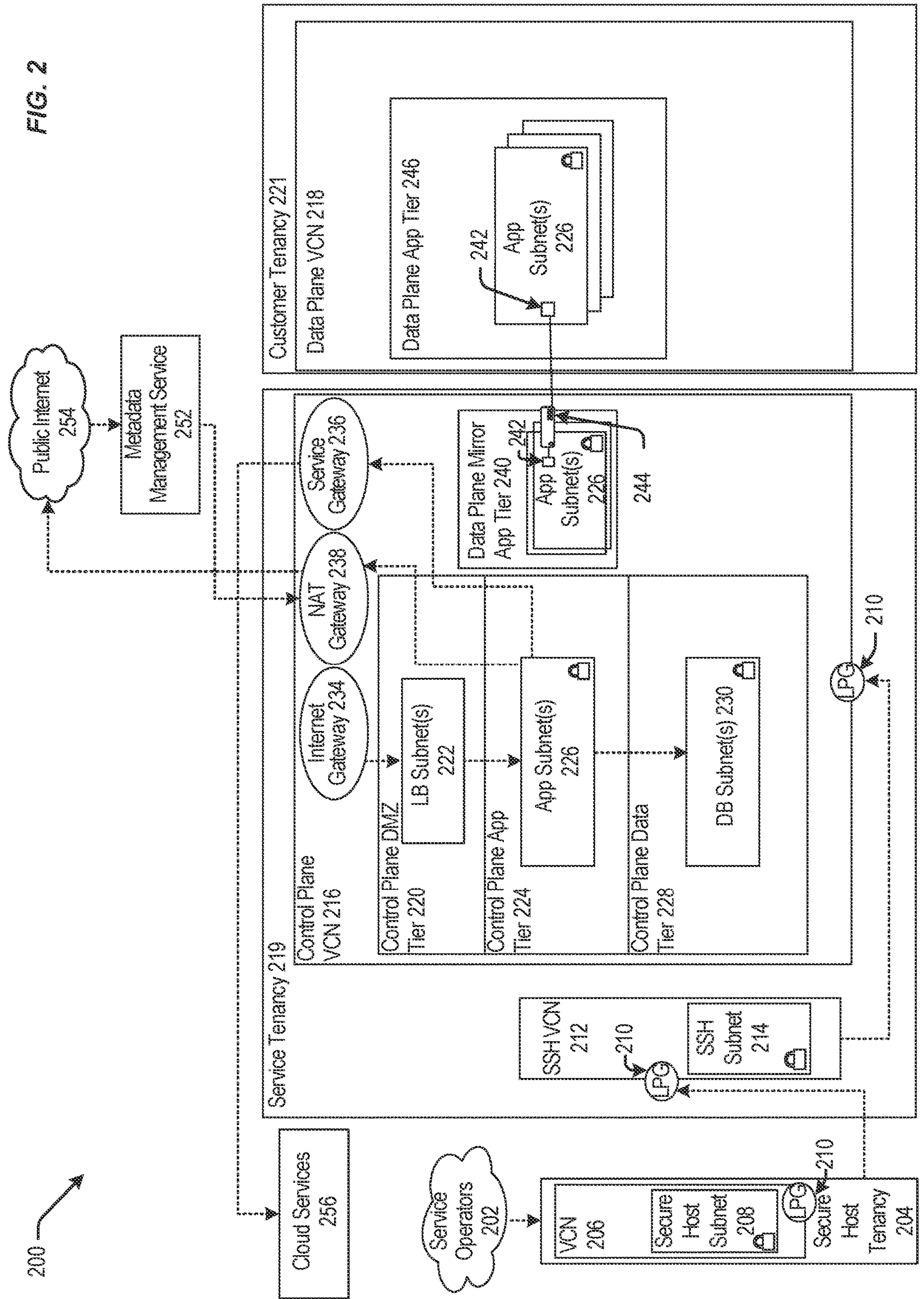
FIG. 2
200
Public Internet 254
Metadata Management Service 252
Cloud Services 256
Service Operators 202
VCN 206
Secure Host Subnet 208
LPG
210
Secure Host Tenancy 204
Service Tenancy 219
SSH VCN 212
SSH Subnet 214
Control Plane VCN 216
Internet Gateway 234
NAT Gateway 238
Service Gateway 236
Control Plane DMZ Tier 220
LB Subnet(s) 222
Control Plane App Tier 224
App Subnet(s) 226
Control Plane Data Tier 228
DB Subnet(s) 230
Data Plane Mirror App Tier 240
242
244
Customer Tenancy 221
Data Plane VCN 218
Data Plane App Tier 246

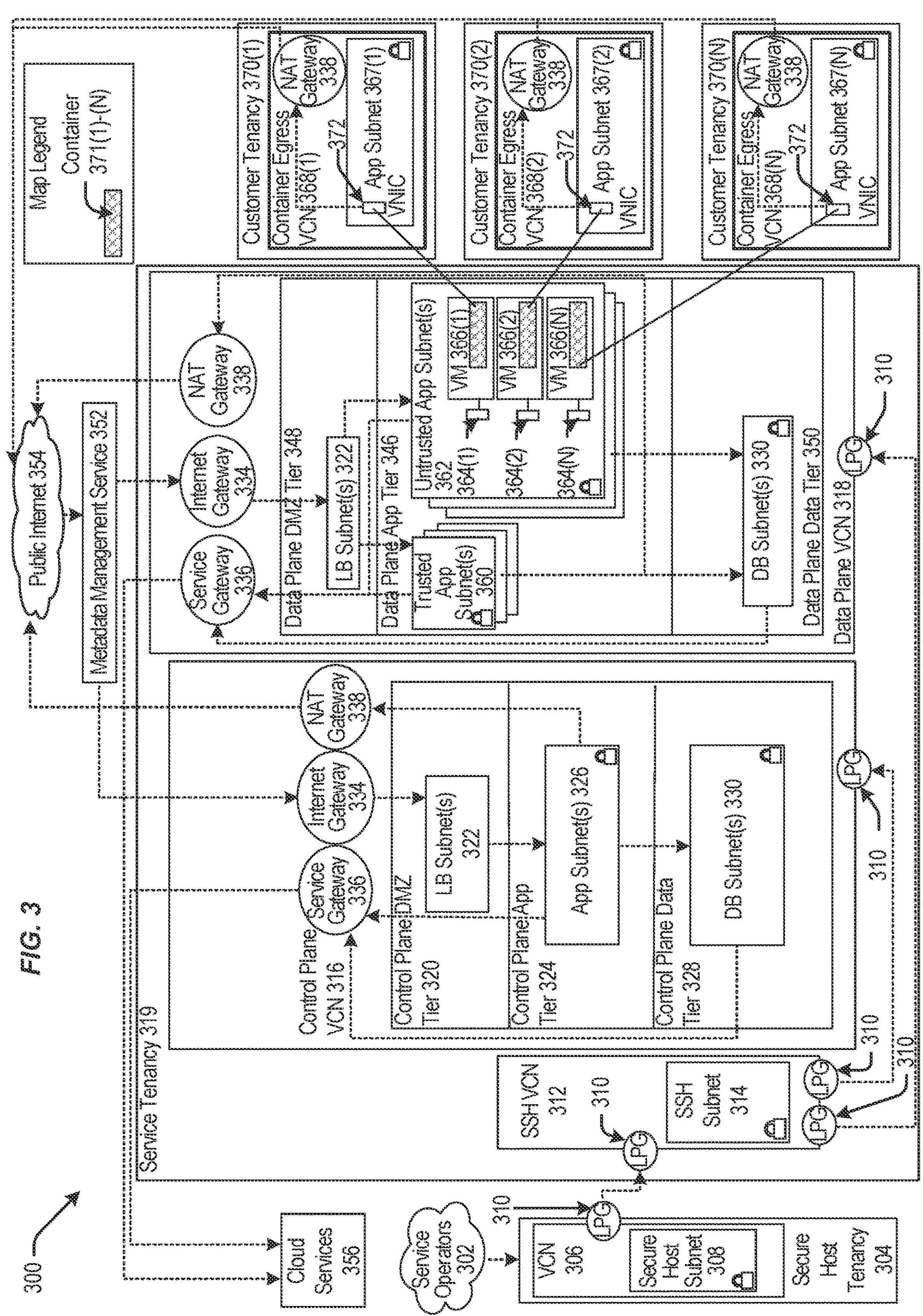
FIG. 3
300
Map Legend
Container 371(1)-(N)
Public Internet 354
Metadata Management Service 352
Customer Tenancy 370(1)
Container Egress VCN 368(1)
NAT Gateway 338
372
App Subnet 367(1)
VNIC
Customer Tenancy 370(2)
Container Egress VCN 368(2)
App Subnet 367(2)
Customer Tenancy 370(N)
Container Egress VCN 368(N)
App Subnet 367(N)
Service Gateway 336
Internet Gateway 334
Data Plane DMZ Tier 348
LB Subnet(s) 322
Data Plane App Tier 346
Trusted App Subnet(s) 360
Untrusted App Subnet(s) 362
364(1)
364(2)
364(N)
VM 366(1)
VM 366(2)
VM 366(N)
DB Subnet(s) 330
Data Plane Data Tier 350
Data Plane VCN 318
LPG
310
Control Plane VCN 316
Control Plane DMZ Tier 320
Control Plane App Tier 324
App Subnet(s) 326
Control Plane Data Tier 328
Service Tenancy 319
SSH VCN 312
SSH Subnet 314
Cloud Services 356
Service Operators 302
VCN 306
Secure Host Subnet 308
Secure Host Tenancy 304

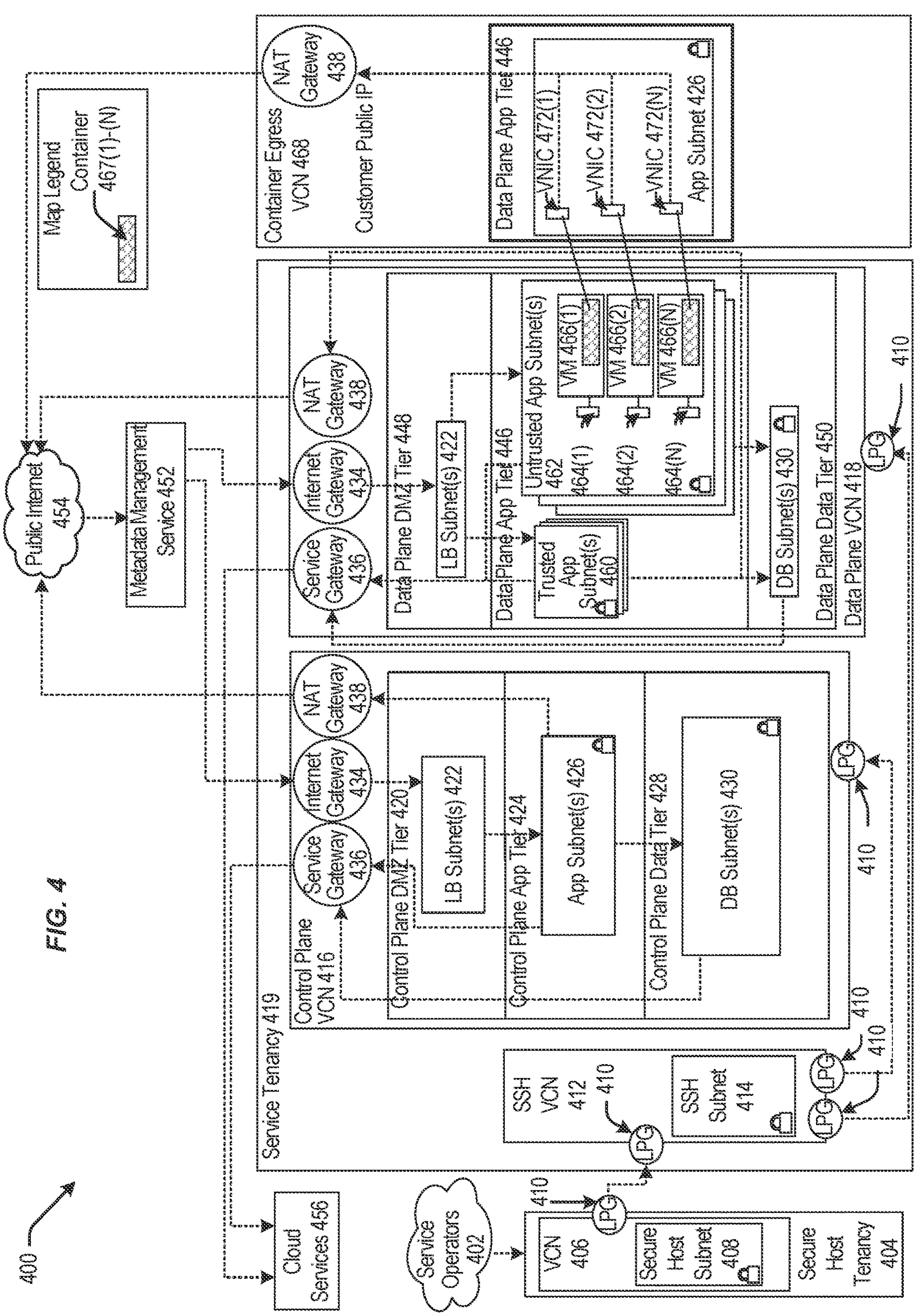
FIG. 4
400
Public Internet 454
Map Legend
Container 467(1)-(N)
Metadata Management Service 452
Container Egress VCN 468
NAT Gateway 438
Customer Public IP
Data Plane App Tier 446
VNIC 472(1)
VNIC 472(2)
VNIC 472(N)
App Subnet 426
Service Tenancy 419
Data Plane VCN 418
Service Gateway 436
Internet Gateway 434
NAT Gateway 438
Data Plane DMZ Tier 448
LB Subnet(s) 422
Data Plane App Tier 446
Trusted App Subnet(s) 460
Untrusted App Subnet(s) 462
464(1)
464(2)
464(N)
VM 466(1)
VM 466(2)
VM 466(N)
DB Subnet(s) 430
Data Plane Data Tier 450
LPG
410
Control Plane VCN 416
Service Gateway 436
Internet Gateway 434
NAT Gateway 438
Control Plane DMZ Tier 420
LB Subnet(s) 422
Control Plane App Tier 424
App Subnet(s) 426
Control Plane Data Tier 428
DB Subnet(s) 430
SSH VCN 412
SSH Subnet 414
Cloud Services 456
Service Operators 402
VCN 406
Secure Host Subnet 408
Secure Host Tenancy 404

DETERMINING APPROVAL WORKFLOWS FOR OBTAINING APPROVALS TO ACCESS RESOURCES

INCORPORATION BY REFERENCE; DISCLAIMER

The following application is hereby incorporated by reference: U.S. patent application Ser. No. 18/529,558, filed on Dec. 5, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to accessing resources on cloud computing networks. More particularly, the present disclosure relates to determining approval workflows for obtaining approvals to access resources on cloud computing networks.

BACKGROUND

Access to resources on a cloud computing network may depend on obtaining approval from one or more approvers. A requestor may submit an approval request to request an approval to access a resource on the cloud computing network. The approval request is submitted to an approver. If the approver grants the request, the requestor may proceed to access the resource. If the approver denies the request, the requestor is denied access to the resource. The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 1-4 are block diagrams illustrating patterns for implementing a cloud infrastructure as a service system in accordance with one or more embodiments;

DETAILED DESCRIPTION

Figure 5:
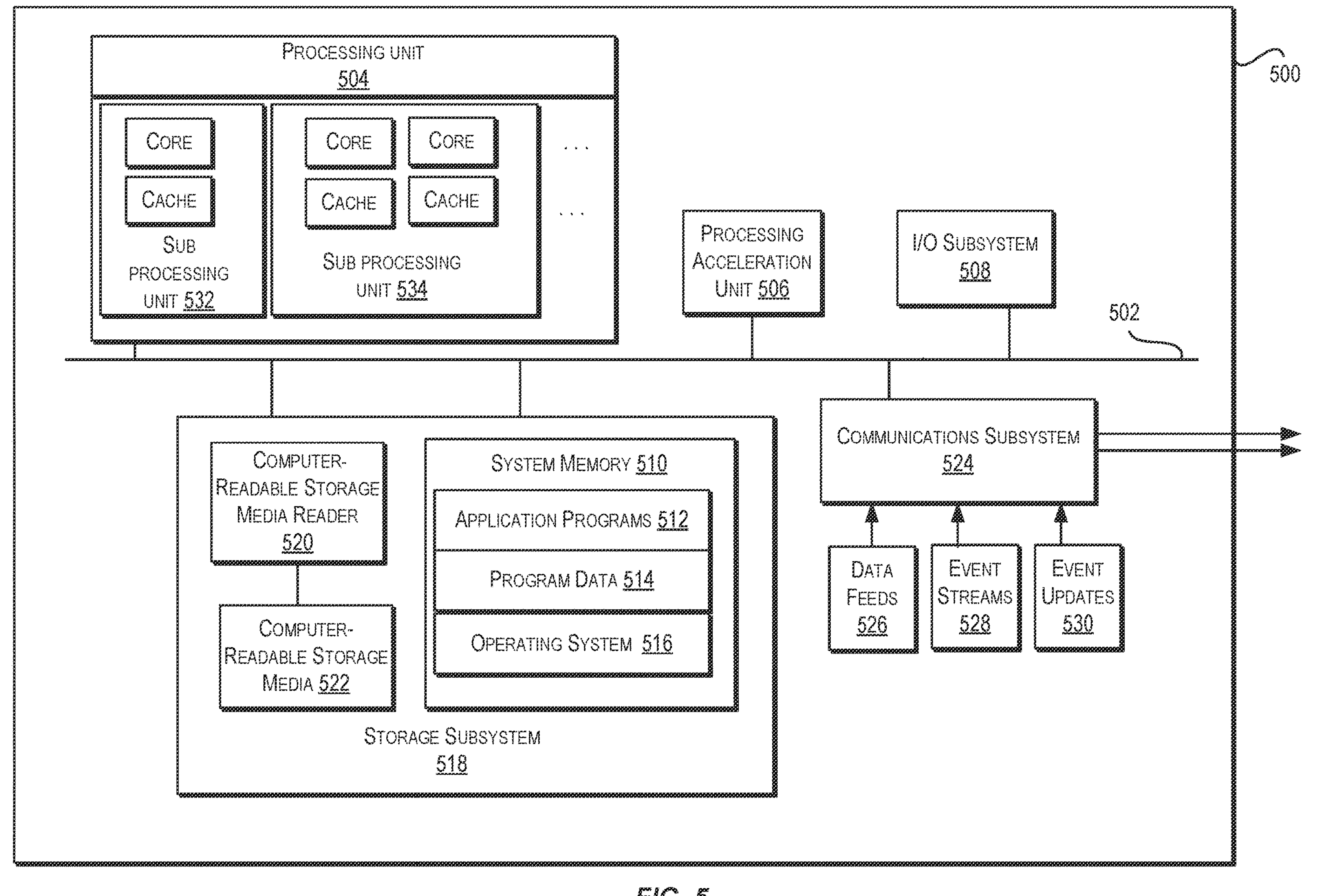
FIG. 5 is a hardware system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. PRACTICAL APPLICATIONS, ADVANTAGES, & IMPROVEMENTS
3. DEFINITIONS
4. CLOUD COMPUTING TECHNOLOGY
5. COMPUTER SYSTEM
6. ARCHITECTURAL OVERVIEW
7. EXAMPLE OPERATIONS
8. MISCELLANEOUS; EXTENSIONS

1. GENERAL OVERVIEW

One or more embodiments generate approval requisitions for executing an approval workflow to obtain an approval to access a resource based on a dependency attribute associated with the resource. For a request to access a first resource, a system accesses a dependency attribute associated with the first resource and determines whether the dependency attribute includes a resource dependency between the first resource and a second resource. If the dependency attribute includes a resource dependency between the first resource and a second resource, the system generates an approval requisition for requesting the approval to access the first resource based on an approval workflow corresponding to the second resource. If the dependency attribute indicates that the approval is not dependent on another resource, the system generates an approval requisition for requesting the approval to access the first resource based on an approval workflow corresponding to the first resource. The system traverses the approval requisition to obtain the approval, and upon obtaining the approval, an access agent obtains a credential to access the first resource and utilizes the credential to access the first resource. Alternatively, if a request to access a resource is rejected, the access agent is denied access to the resource.

2. PRACTICAL APPLICATIONS, ADVANTAGES & IMPROVEMENTS

In one example, a cloud operator requests access to a first resource that includes a service component associated with a cloud service. The service component has a resource dependency with a second resource that includes a customer-facing component of the cloud service. The cloud operator may access the service component to provide technical support services. The customer may require that the cloud operator obtain approval from the customer to access the service component, for example, because the customer-facing component utilizes the service component. In one example, the service component may be located in a first compartment of a virtual cloud network allocated to the cloud operator, and the customer-facing component may be located in a second compartment of the virtual cloud network allocated to the customer. Even though the service component is located in the first compartment allocated to the cloud operator, a security policy implemented by the customer may require that the cloud operator obtain customer approval to access the service component. Additionally, or alternatively, the service component may be a hidden resource that is invisible and/or inaccessible to the customer. It may be impractical for the customer to define an approval workflow for a hidden resource, particularly when the hidden resource is located in a compartment allocated to the cloud operator.

The cloud operator may obtain approval from the customer based on the resource dependency between the service component and the customer-facing component. To obtain the customer approval, the system receives an approval request from the cloud operator, determines the resource dependency between the service component and the customer-facing component, and generates an approval requisition to request approval based on an approval workflow corresponding to the customer-facing component. Upon obtaining the customer approval, the system receives a credential request from the cloud operator for the system to generate a credential for the cloud operator to access the service component. The system generates the credential, and the cloud operator utilizes the credential to access the service component.

Advantageously, one or more embodiments provide improved security, transparency, and/or customer control. Resource owners, such as customers, have enhanced control over who can access their own resources as well as other resources that interact with their resources. This enhanced control protects sensitive resources by reducing risks of unauthorized access or data breaches. Additionally, or alternatively, one or more embodiments may be implemented in furtherance of compliance with regulations pertaining to data privacy or security. Further, providing customers with the ability to approve or deny access by cloud operators fosters transparency and builds trust between customers and the cloud operators.

Further advantageously, one or more embodiments allow different resource owners to customize approval workflows based on their specific needs and preferences, allowing for a more tailored and flexible security models. Further, resource owners may adapt their approval workflows as circumstances change. These customized approval workflows can be propagated throughout a set of resources by way of resource dependencies, thereby reducing repetitive approval workflows as well as the potential for inconsistent approval workflows among the set of resources. Additionally, or alternatively, different resource owners may have particular security and access requirements. Allowing resource owners to approve access ensures that the cloud operator meets the particular security requirements of the different resource owners. Additionally, or alternatively, one or more embodiments may provide access records that may be utilized for incident response, forensic analysis, and/or compliance reporting.

One or more embodiments described in this Specification and/or recited in the claims may not be included in this General Overview section.

3. DEFINITIONS

As used herein, the term "compartment" refers to a set of one or more logical containers utilized to organize and segregate resources, services, and/or permissions of a cloud computing environment.

As used herein, the term "logical container" refers to a virtual structure used to organize and manage cloud resources, services, or data.

As used herein, the term "tenant" refers to an entity that receives cloud computing services provided by a cloud provider.

As used herein, the term "cloud provider" or "service provider" refers to a provider of cloud computing services, such as an Infrastructure as a Service (IaaS) and/or one or more target services located on a cloud provider infrastructure.

As used herein, the term "cloud operator" refers to an entity that maintains cloud infrastructure. A cloud operator may perform services on behalf of a cloud provider, such as provisioning, configuring, troubleshooting, debugging, maintaining, or managing cloud resources and related infrastructure. A cloud operator and a cloud provider may be different entities or the same entities.

As used herein, the term "customer" may refer to a tenant or an entity that receives services from a tenant.

As used herein, the term "network entity" refers to a device, component, or element within a computer network and/or cloud infrastructure. A network entity may be implemented in hardware and/or software.

4. CLOUD COMPUTING TECHNOLOGY

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. COMPUTER SYSTEM

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

6. ARCHITECTURAL OVERVIEW

Figure 6A:
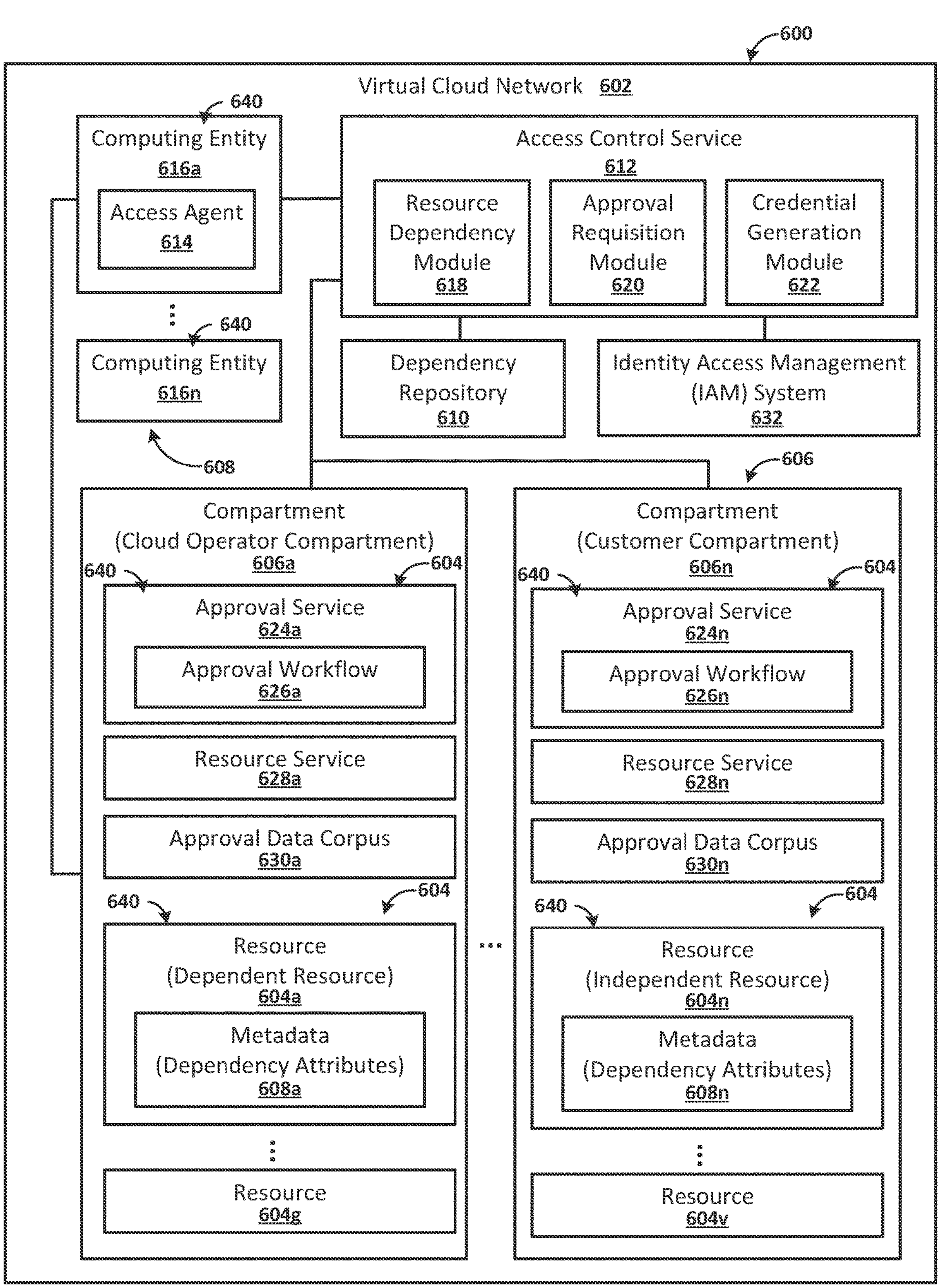
FIGS. 6A-6C illustrate features of an example system in accordance with one or more embodiments.
Figure 6B:
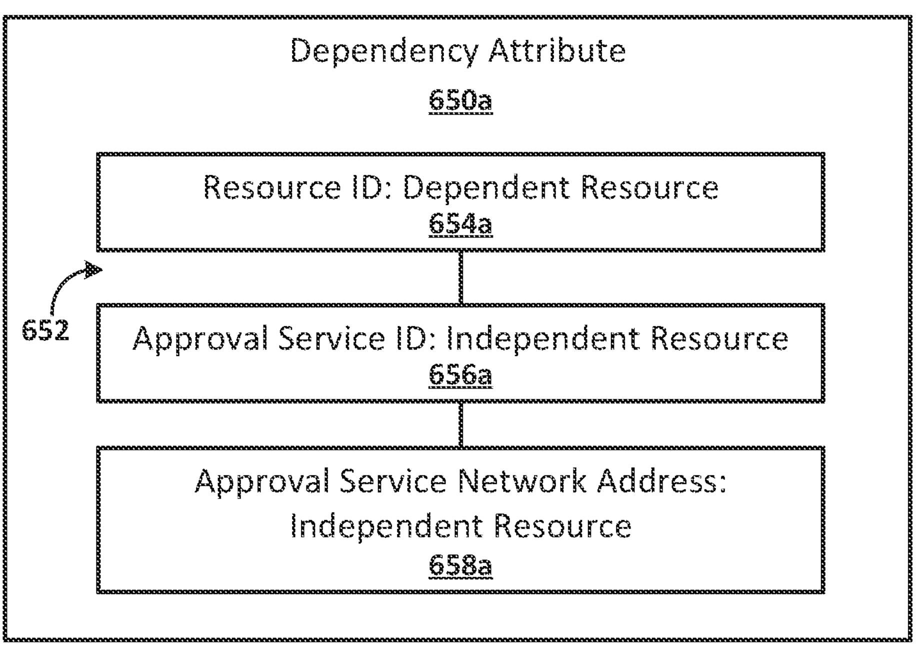
Figure 6C:
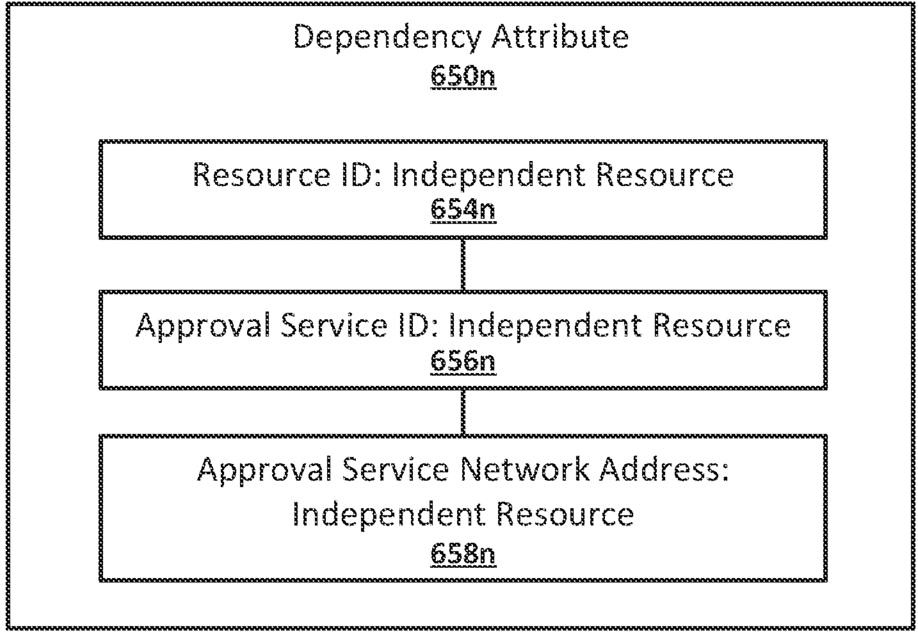

FIGS. 6A-6C illustrate an example system 600 in accordance with one or more embodiments. The system 600 described with reference to FIGS. 6A-6C may perform operations pertaining to obtaining approval to access a resource and/or operations pertaining to obtaining a credential to access a resource. Additionally, or alternatively, the system 600 may perform operations pertaining to determining approval workflows for requesting approval to access a resource. One or more embodiments may include techniques described in the '558 Application. In one example, one or more embodiments may include one or more systems, components, and/or operations described in the '498 Application.

A. Example Virtual Cloud Network

As shown in FIG. 6A, the system 600 includes a computing network, such as a virtual cloud network 602. The virtual cloud network 602 includes a plurality of resources 604, such as resource **604*a*, resource 604*g*, resource 604*n*, and resource 604*v*. The resources 604 may include one or more of the following: virtual machines, databases, services, data storage resources, containers, compartments, or networking resources. The virtual cloud network 602 may include a plurality of compartments 606, such as compartment 606*a* and compartment 606*n*. A compartment 606 may include one or more resources 604. As shown in FIG. 6A, compartment 606*a* includes resource 604*a* and resource 604*g*, and compartment 606*n* includes resource 604*n* and resource 604*v*. In one example, compartment 606*a* is a cloud operator compartment and compartment 606*n* is a customer compartment. The resources 604 may include metadata 608. In one example, metadata 608*a* is associated with resource 604*a*, and metadata 608*n* is associated with resource 604*n*. The metadata 608 associated with a resource 604 may define properties of the resource 604. In one example, the metadata 608 associated with a resource 604 includes one or more dependency attributes. Additionally, or alternatively, the virtual cloud network 602 may include a dependency attribute repository 610 that stores a set of dependency attributes. A dependency attribute indicates whether a resource 604 is a dependent resource or an independent resource. A resource 604 is a dependent resource if approval to access the resource 604 depends on an approval workflow corresponding to another resource 604. A resource is an independent resource if approval to access the resource is independent of any approval workflow corresponding to another resource 604. A dependency attribute corresponding to a dependent resource defines a resource dependency between the dependent resource and one or more other resources 604. In one example, resource 604*a* is a dependent resource and resource 604*n* is an independent resource. Additionally, resource 604*g* is an independent resource. In one example, metadata 608*a* includes a dependency attribute indicating that resource 604*a* is a dependent resource. Additionally, the dependent attribute of metadata 608*a* defines a resource dependency between resource 604*a* (dependent resource) and resource 604*n* (independent resource). A set of resources 604 may include a series of dependent resources. In one example, a first resource 604 may be a dependent resource with respect to a second resource 604, and the second resource 604 may be a dependent resource with respect to a third resource 604. Additionally, or alternatively, approval to access a resource 604 may depend on a plurality of approval workflows corresponding to a plurality of resources 604. In one example, a first resource 604 may be a dependent resource with respect to a second resource 604 and a third resource 604. Example dependency attributes and resource dependencies are further described with reference to FIGS. 6B and 6C**.

Referring further to FIG. 6A, the virtual cloud network 602 includes an access control service 612. The access control service 612 performs operations associated with obtaining approvals and credentials to access resources 604. Additionally, the access control service 612 performs operations associated with determining approval workflows for requesting approvals to access resources 604. The access control service 612 may receive approval requests from an access agent 614 executing on a computing entity 616. The system 600 may include one or more computing entities 616 (e.g., computing entity **616*a* and computing entity 616*n*) that respectively execute an access agent 614**.

The access control service 612 includes a resource dependency module 618, an approval requisition module 620, and a credential generation module 622. The resource dependency module 618 accesses dependency attributes corresponding to resources 604 identified in approval requests and determines, based on the dependency attributes, where to send the approval requests for approval. The approval requisition module 620 generates approval requisitions for requesting approval to access resources. The approval requisitions are generated based on the dependency attribute and/or the resource dependency indicated by the dependency attribute. Additionally, the approval requisition module 620 may receive approval confirmations indicating that an approval request is granted or denied. The credential generation module 622 generates credential requests for requesting credentials to access resources 604 for which approval requests have been granted. Additionally, the credential generation module 622 may receive approval confirmations indicating that a credential request is granted or denied.

The virtual cloud network 602 may include one or more approval services 624. An approval service 624 may be associated with a particular compartment 606. Additionally, or alternatively, an approval service 624 may be associated with a particular set of one or more resources 604. An approval service 624 includes one or more approval workflows 626 corresponding to a particular set of one or more resources associated with the approval service 624. The approval service 624 may receive approval requisitions from the approval requisition module 620. Based on the approval requisitions, the approval service 624 determines approval workflows 626 for obtaining approvals to access resources 604. Additionally, the approval service 624 executes approval workflow operations corresponding to the approval workflows 626 to determine whether the approval requests are granted or denied.

In one example, as shown in FIG. 6A, compartment 606*a* includes approval service 624*a* corresponding to resource 604*g*. Approval service 624*a* includes approval workflow 626*a*. The approval requisition module 620 may transmit approval requisitions to approval service 624*a* for requesting approval to access resource 604*g*. The approval service 624*a* may execute approval workflow operations corresponding to approval workflow 626*a*. Additionally, compartment 606*n* includes approval service 624*n* corresponding to resource 604*n*. Approval service 624*n* includes approval workflow 626*n* corresponding to resource 604*n*. The approval requisition module 620 may transmit approval requisitions to approval service 624*n* for requesting approval to access resource 604*n*. Additionally, or alternatively, the approval requisition module 620 may transmit approval requisitions to approval service 624*n* for requesting approval to access resource 604*a* (dependent resource) based on a resource dependency with resource 604*n* (independent resource). The approval service 624*n* may execute approval workflow operations corresponding to approval workflow 626*n*.

Referring further to FIG. 6A, the virtual cloud network 602 may include one or more resource services 628. A resource service 628 may be associated with a particular compartment 606. Additionally, or alternatively, a resource service 628 may be associated with a particular set of one or more resources 604. A resource service 628 may provide an access agent 614 with access to one or more resources 604, for example, in response to receiving an access request accompanied by a credential to access a resource 604. As further shown in FIG. 6A, the virtual cloud network 602 may include one or more approval data corpuses 630. An approval data corpus 630 may be associated with a particular compartment 606. Additionally, or alternatively, an approval data corpus 630 may be associated with a particular set of one or more resources 604. The approval requisition module 620 may transmit approval confirmations to a resource service 628. An approval confirmation transmitted to the resource service 628 may indicate that an approval request has been approved. The resource service 628 may store the approval confirmations and/or information associated with the approval confirmations in an approval data corpus 630. The resource service 628 may receive access requests from one or more access agents 614. An access request may include a request to access a resource 604 and credential for accessing the resource 604 that the access agent 614 obtains from the credential generation module 622. The resource service 628 may validate that the access agent 614 is approved to access the resource 604 based on information in the approval data corpus 630. Additionally, the resource service 628 may validate the credential provided by the access agent 614 with the access request. Upon successfully validating the access request, the resource service 628 may provide the access agent 614 with access to the resource 604.

In one example, as shown in FIG. 6A, compartment 606*a* includes resource service 628*a* corresponding to resource 604*a*. Additionally, compartment 606*a* includes approval data corpus 630*a* corresponding to resource service 628*a*. Resource service 628*a* stores approval confirmations and/or information associated with the approval confirmations corresponding to approvals to access resource 604*a* in approval data corpus 630*a*. Additionally, resource service 628*a* validates access requests to access resource 604*a*, and upon successfully validating the access requests, provides access to resource 604*a*. As further shown in FIG. 6A, compartment 606*n* includes resource service 628*n* corresponding to resource 604*n*. Additionally, compartment 606*n* includes approval data corpus 630*n* corresponding to resource service 628*n*. Resource service 628*n* stores approval confirmations and/or information associated with the approval confirmations corresponding to approvals to access resource 604*n* in approval data corpus 630*n*. Additionally, resource service 628*n* validates access requests to access resource 604*n*, and upon successfully validating the access requests, provides access to resource 604*n*.

Referring further to FIG. 6A, the virtual cloud network 602 includes an identity access management (IAM) system 632. The IAM system 632 manages and stores access policies associated with various principals. The principals associated with access policies in the IAM system 632 may include one or more delegate principles and/or one or more recipient principles. The IAM system 632 includes one or more access policies associated with the identity of the principal. The access policies may define permissions or actions that are allowed or denied, for example, with respect to one or more resources 604 and/or with respect to one or more compartments 606 of the virtual cloud network 602. The access control service 612 may determine and/or generate one or more access policies in the IAM system 632 in connection with an approval workflow. The credential generation module 622 may validate access policies in the IAM system 632 when generating credentials for accessing resources 604. A credential to access an independent resource, such as resource 604*n*, may be based on a recipient principal. A credential to access a dependent resource, such as resource 604*a*, may be based on a delegate principal.

Referring further to FIG. 6A, the system 600 may include a plurality of network entities 640. The plurality of network entities 640 may include a plurality of resources 604. The network entities 640 may be located throughout one or more virtual cloud networks 602. A network entity 640 may reside on a substrate network, an overlay network, or a network interface. A network entity 640 may be implemented in hardware and/or software. A network entity may include a node, a host, an agent, a service, a component, an endpoint, or other element. The plurality of network entities 640 may include one or more substrate entities, one or more interface entities, and/or one or more overlay entities.

As used herein, the term "substrate entity" refers to a network entity 640 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another and/or with other network entities 640, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface, or an interface service executing or executable on the network interface. A node on the network interface may include a programmable hardware component, a memory component, or a gateway component. In one example, a network interface may include a network interface card such as a smartNIC. Additionally, or alternatively, a network interface may include a node or an endpoint on a network interface card or smartNIC.

A gateway component may provide connectivity between the substrate network and the network interface and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or alternatively, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts. The overlay client may acta as a consumer of resources or services from an overlay host.

The plurality of network entities 640 may include a plurality of data repositories. Data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Further, one or more of the data repositories may be implemented or executed on the same computing system as virtual cloud network 602. Additionally, or alternatively, one or more of the data repositories may be implemented or executed on a computing system separate from virtual cloud network 602.

B. Example Dependency Attributes

Referring to FIGS. 6B and 6C, example dependency attributes 650 are further described. Dependency attributes 650 may be stored in metadata 608 associated with a resource 604 and/or in a dependency attribute repository 610. Dependency attribute **650*a* shown in FIG. 6B may correspond to resource 604*a* shown in FIG. 6A. In one example, dependency attribute 650*a* may be stored in metadata 608*a* corresponding to resource 604*a*. Dependency attribute 650*n* shown in FIG. 6**C may correspond to resource

604*n* shown in FIG. 6A. In one example, dependency attribute 650*n* may be stored in metadata 608*n* corresponding to resource 604*n*.

Referring to FIG. 6B, dependency attribute 650*a* is indicative of a dependent resource based on a resource dependency 652 between a first resource 604 and a second resource 604. The first resource 604 may be resource 604*a*, and the second resource 604 may be resource 604*n* described with reference to FIG. 6A. The resource dependency 652 between the first resource 604 and the second resource 604 includes a mapping between a resource identifier 654*a* corresponding to a dependent resource and an approval service identifier 656*a* corresponding to an independent resource. Resource identifier 654*a* may identify resource 604*a*. Approval service identifier 656*a* may identify approval service 624*n* corresponding to resource 604*n*. Additionally, or alternatively, dependency attribute 650*a* may include a mapping of resource identifier 654*a* and/or approval service identifier 656*a* to an approval service network address 658*a* of approval service 624*n*. In response to an approval request to access resource 604*a*, the resource dependency module 618 (FIG. 6A) may access dependency attribute 650*a* and determine the approval service identifier 656*a* and/or the approval service network address 658*a* based on the dependency attribute 650*a*. The resource dependency module 618 may provide the approval service identifier 656*a* and/or the approval service network address 658*a* to the approval requisition module 620 (FIG. 6A), and the approval requisition module 620 may transmit an approval requisition to approval service 624*n* to request and/or obtain approval to access resource 604*a*.

Referring to FIG. 6C, dependency attribute 650*n* is indicative of an independent resource based on a mapping between a resource identifier 654*n* and an approval service identifier 656*n* corresponding to the same resource. In one example, resource identifier 654*n* may identify resource 604*n*, and approval service identifier 656*n* may identify approval service 624*n* corresponding to resource 604*n*, as described with reference to FIG. 6A. Additionally, or alternatively, approval service identifier 656*n* may have a null value. The null value may indicate that resource 604*n* is an independent resource, and/or that approval service 624*n* corresponds to resource 604*n*. Dependency attribute 650*n* may include a mapping of resource identifier 654*n* and/or approval service identifier 656*n* to an approval service network address 658*n*. In one example, the approval service network address 658*n* may correspond to approval service 624*n*. Alternatively, resource identifier 654*n* may identify resource 604*g*, and approval service identifier 656*n* may identify approval service 624*a* corresponding to resource 604*g* (FIG. 6A.), and the approval service network address 658*n* may correspond to approval service 624*a*. In one example, in response to an approval request to access resource 604*n*, the resource dependency module 618 (FIG. 6A) may access dependency attribute 650*n* and determine the approval service identifier 656*n* and/or the approval service network address 658*n* based on the dependency attribute 650*n*. The resource dependency module 618 may provide the approval service identifier 656*n* and/or the approval service network address 658*n* to the approval requisition module 620 (FIG. 6A), and the approval requisition module 620 may transmit an approval requisition to the approval service 624*n* to request and/or obtain approval to access resource 604*n*.

In one or more embodiments, the system 600 may include more or fewer components than the components described with reference to FIGS. 6A-6C. The components described with reference to FIGS. 6A-6C may be local to or remote from one another. The components described with reference to FIGS. 6A-6C may include software and/or hardware components. The components may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

7. EXAMPLE OPERATIONS

Figure 7A:
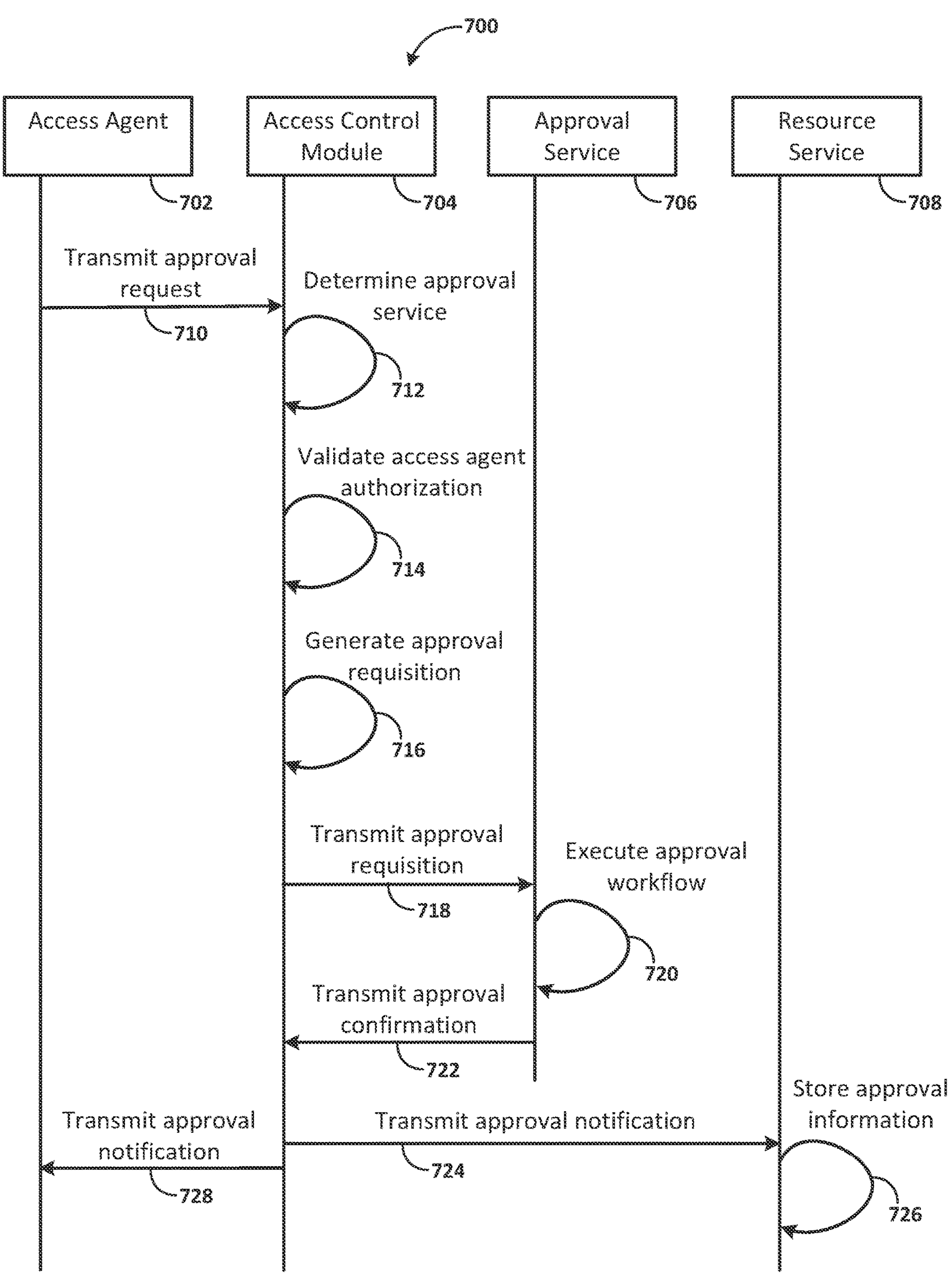
FIG. 7A shows a diagram that illustrates example operations pertaining to obtaining approval to access a resource.
Figure 7B:
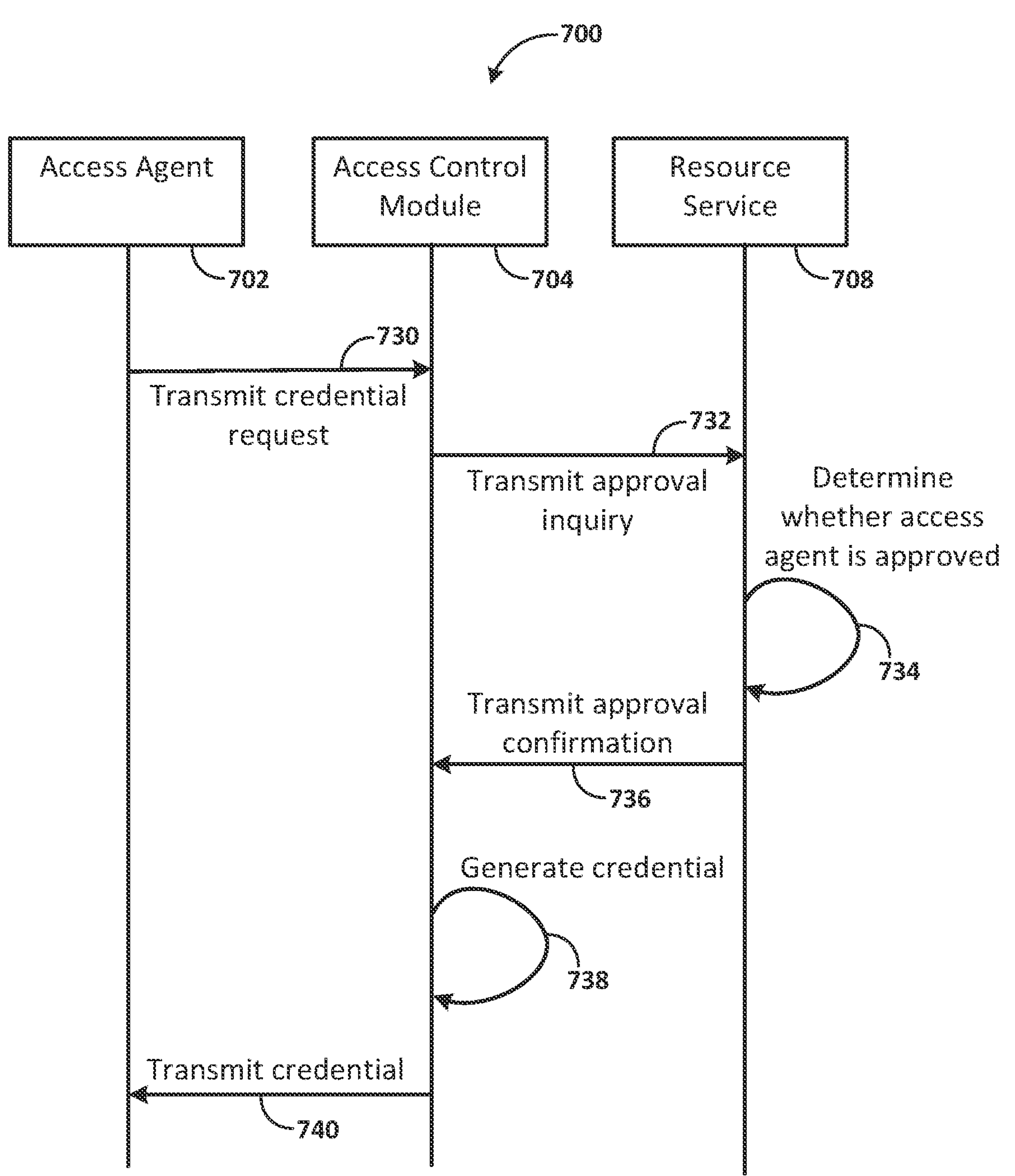
FIG. 7B shows a diagram that illustrates example operations pertaining to obtaining a credential to access a resource.

Referring now to FIGS. 7A and 7B, operations 700 pertaining to obtaining approval to access a resource (FIG. 7A) and obtaining a credential to access the resource (FIG. 7B) are further described. One or more operations 700 described with reference to in FIGS. 7A and 7B may be modified, combined, rearranged, or omitted. Accordingly, the particular sequence of operations 700 described with reference to FIGS. 7A and 7B should not be construed as limiting the scope of one or more embodiments. As shown in FIG. 7A, the operations 700 may include operations performed by and/or associated with one or more of the following: an access agent 702, an access control module 704, an approval service 706, and/or a resource service 708. As shown in FIG. 7B, the operations 700 may include operations performed by and/or associated with one or more of the following: the access agent 702, the access control module 704, and/or the resource service 708. In one example, the operations 700 may be performed by the one or more components of the system 600 described with reference to FIGS. 6A and 6B.

A. Obtaining Approval to Access a Resource

Referring to FIG. 7A, operations 700 pertaining to obtaining approval to access a resource are further described. As shown in FIG. 7A, an access agent 702 transmits an approval request to an access control module 704 (operation 710). The approval request may include a request for the access control service to request an approval for the access agent 702 to access a first resource. The access control module 704 receives the approval request from the access agent 702. In one example, the approval request may include information pertaining to the first resource that the access agent 702 is requesting approval to access such as a resource identifier that identifies the first resource.

Upon receiving the approval request, the access control module 704 determines an approval service 706 for requesting approval to access the first resource (operation 712). The access control module 704 may determine the approval service 706 based on a dependency attribute associated with the first resource. The access control module 704 may access the dependency attribute in metadata associated with the first resource and/or in a dependency attribute repository. In one example, the access control module 704 determines a resource dependency between the first resource and the second resource by accessing a dependency attribute associated with the first resource and determining that the dependency attribute includes an approval service identifier corresponding to the second resource.

When the dependency attribute associated with the first resource includes a resource dependency between the first resource and a second resource, the access control module 704 selects the approval service 706 corresponding to the second resource. When the dependency attribute associated with the first resource indicates that the first resource is independent, the access control module 704 selects the approval service 706 corresponding to the first resource.

Upon having determined the approval service 706 for requesting approval to access the first resource, the access control module 704 executes one or more validation operations to determine whether the access agent 702 is authorized to submit the approval request to access the first resource (operation 714). When the dependency attribute associated with the first resource includes a resource dependency between the first resource and the second resource, the authorization of the access agent 702 to submit the approval request may be based at least in part on a set of one or more permissions corresponding to the second resource. In one example, when the approval agent is authorized, based on the set of one or more permissions, to access the second resource, the approval agent the access control module 704 determines that the approval agent is authorized to submit the approval request to access the first resource. Additionally, or alternatively, when the approval agent is authorized, based on the set of one or more permissions, to submit approval requests to access the second resource, the access control module 704 determines that the approval agent is authorized to submit the approval request to access the first resource. Alternatively, when the first resource is an independent resource, the authorization of the access agent 702 to submit the approval request may be based at least in part on a set of one or more permissions corresponding to the first resource.

In one example, the approval request may include an authentication credential that identifies the access agent. The authentication credential may include at least one of the following: a token, a digital certificate, a digital signature, or a username. The access control module 704 may utilize the authentication credential to validate the identity of the access agent 702, for example, in connection with determining whether the access agent 702 is authorized to submit the approval request to access the first resource.

Upon having determined the approval service 706 for requesting approval to access the first resource and/or upon having determined that the access agent 702 is authorized to submit the approval request to access the first resource, the access control module 704 generates an approval requisition (operation 716). The approval requisition may include information from the approval request such as the resource identifier that identifies the first resource. In one example, the access control module 704 may add information to the approval requisition that was not in the approval request, for example, based on information in the approval request and/or based on a dependency attribute associated with the first resource. In one example, the access control module 704 may include information pertaining to the second resource in the approval requisition, such as a second resource identifier that identifies the second resource, an approval service identifier that identifies the approval service corresponding to the second resource, and/or an approval service network address corresponding to the second resource. In one example, the access control module may determine a resource identifier corresponding to the first resource and an approval service identifier of the approval service 706 corresponding to the second resource. Additionally, the access control module 704 may populate the approval requisition with the resource identifier corresponding to the first resource and the approval service identifier corresponding to the second resource.

The access control module 704 transmits the approval requisition to the approval service 706 (operation 718). The approval service 706 receives the approval requisition from the access control module 704. Upon receiving the approval requisition, the approval service 706 executes an approval workflow to obtain approval to access the first resource (operation 720). The approval workflow may include one or more operations described in the '558 Application, such as one or more pre-approval operations and/or one or more approval operations. In one example, the approval workflow may include a set of one or more approval workflow operations. The set of one or more approval workflow operations may include requesting approval from a set of one or more approvers associated with the second resource for the access agent to access the first resource.

In one example, the approval service 706 determines, based on the approval workflow, that the approval request for the access agent 702 to access the first resource is approved. When the approval service 706 determines that the approval request is approved, the approval service 706 generates and transmits an approval confirmation to the access control module (operation 722). The approval confirmation indicates that the approval request is approved. Additionally, or alternatively, the approval confirmation may include an approval to access the first resource. Alternatively, if the approval request is rejected, the approval service 706 may generate and transmit a rejection to the access control module 704 indicating that the approval request is denied.

The access control module 704 receives the approval confirmation from the approval service 706. The access control module 704 may determine, based on the approval confirmation, that the approval included in or indicated by the approval confirmation is for the access agent to access the first resource. In one example, the access control module 704 may determine that the approval is for accessing the first resource based on a dependency attribute associated with the approval confirmation. The access control module 704 may access the dependency attribute based on information in the approval confirmation. In one example, the access control module 704 may determine, based on the dependency attribute, a resource identifier corresponding to the first resource. Additionally, the access control module 704 may determine, based on the resource identifier corresponding to the first resource, that the approval is for the access agent to access the first resource.

Upon receiving the approval confirmation, the access control module 704 may transmit one or more approval notifications. In one example, the access control module 704 transmits an approval notification to the resource service 708 corresponding to the first resource (operation 724). The resource service 708 stores the approval notification and/or approval information pertaining to the approval in an approval data corpus (operation 726). Additionally, or alternatively, the access control module 704 transmits an approval notification to the access agent 702 (operation 728). The approval notification transmitted to the access agent 702 may include an approval identifier that may be utilized to identify the approval information in the approval data corpus. The access agent 702 may receive the approval notification from the access control module 704. Upon receiving the approval notification, the access agent 702 initiates one or more operations 700 to obtain a credential for accessing the first resource.

B. Obtaining a Credential for Accessing a Resource

Referring to FIG. 7B, operations 700 pertaining to obtaining a credential to access a resource are further described. The operations 700 described with reference to FIG. 7B may be executed to obtain a credential for accessing the first resource, for example, upon receiving an approval notification as described with reference to FIG. 7A.

To obtain a credential for accessing the first resource, the access agent 702 transmits a credential request to the access control module 704 (operation 730). The credential request may include a request to obtain a credential for accessing a resource such as the first resource described with reference to FIG. 7A. The access control module 704 receives the credential request from the access agent 702. In one example, the credential request includes information pertaining to the credential being requested, such as a resource identifier that identifies the resource to be accessed utilizing the credential and/or an approval identifier that may be utilized to identify approval information in the approval data corpus to confirm that the access agent is approved to access the resource.

Upon receiving the credential request, the access control module 704 generates and transmits an approval inquiry to a resource service 708 that corresponds to the resource to be accessed utilizing the credential (operation 732). The access control module 704 may identify the resource service 708 based on information in the credential request such as the resource identifier. The resource service 708 receives the approval inquiry from the access control module. Upon receiving the approval inquiry, the resource service 708 determines whether the access agent is approved to access the resource (operation 734). The resource service 708 may determine whether the access agent is approved to access the resource based on information in the approval data corpus. When the resource service 708 determines that the access agent is approved to access the resource, the resource service 708 generates and transmits an approval confirmation to the access control module (operation 736). The approval confirmation may indicate that the access control module is authorized to generate a credential for the access agent to access the resource. Alternatively, when the resource service 708 determines that the access agent is not approved to access the resource, the resource service 708 may generate and transmit a rejection to the access control module 704.

The access control module 704 receives the approval confirmation from the resource service indicating that the access agent is authorized to access the resource. Upon receiving the approval confirmation, the access control module 704 generates a credential (operation 738) and transmits the credential to the access agent (operation 740). Upon receiving the credential, the access agent may utilize the credential to access the resource. The access to the resource may include one or more access operations described in the '558 Application.

C. Determining an Approval Workflow for Obtaining an Approval

Figure 8:
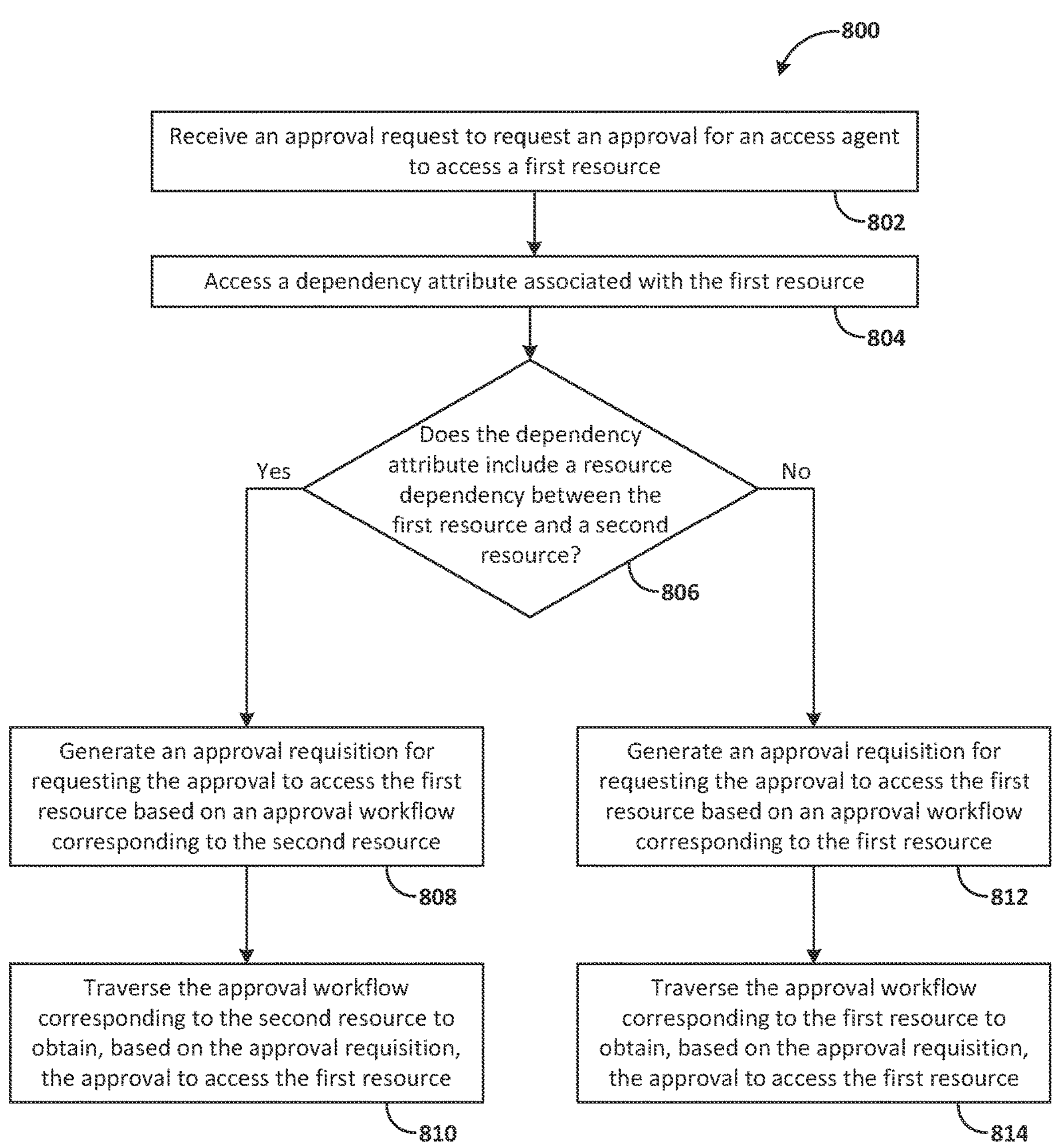
FIG. 8 is a flowchart that illustrates example operations pertaining to determining approval workflows for requesting approval to access a resource.

Referring now to FIG. 8, operations 800 pertaining to determining approval workflows for requesting approval to access a resource are further described. One or more operations 800 described with reference to in FIG. 8 may be modified, combined, rearranged, or omitted. Accordingly, the particular sequence of operations 800 described with reference to FIG. 8 should not be construed as limiting the scope of one or more embodiments. In one example, the operations described with reference to FIG. 8 may include one or more operations 700 described with reference to FIGS. 7A and 7B. In one example, the operations 800 may be performed by the one or more components of the system 600 described with reference to FIGS. 6A-6C.

As shown in FIG. 8, the operations 800 include receiving an approval request to request an approval for an access agent to access a first resource (operation 802). The operations 800 further include accessing a dependency attribute associated with the first resource (operation 804) and determining whether the dependency attribute includes a resource dependency between the first resource and a second resource (operation 806).

In one example, the dependency attribute includes a resource dependency between the first resource and a second resource (e.g., the first resource is a dependent resource). When the dependency attribute includes a resource dependency between the first resource and the second resource, the operations 800 include generating an approval requisition for requesting the approval to access the first resource based on an approval workflow corresponding to the second resource (operation 808). Additionally, the operations 800 include traversing the approval workflow corresponding to the second resource to obtain, based on the approval requisition, the approval to access the first resource (operation 810). In one example, traversing the approval workflow corresponding to the second resource includes determining a network address of an approval service corresponding to the second resource based on an approval service identifier associated with the second resource and transmitting the approval requisition to the network address of the approval service. The approval service corresponding to the second resource receives the approval requisition, and responsive to receiving the approval requisition, the approval service executes a set of one or more approval workflow operations to determine that the access agent is approved to access the first resource. The set of one or more approval workflow operations may include one or more operations described in the '558 Application.

In one example, the dependency attribute does not include a resource dependency between the first resource and the second resource (e.g., the first resource is an independent resource). When the dependency attribute does not include a resource dependency between the first resource and the second resource (e.g., when the first resource is an independent resource), the operations 800 include generating an approval requisition for requesting the approval to access the first resource based on an approval workflow corresponding to the first resource (operation 812). Additionally, the operations 800 include traversing the approval workflow corresponding to the first resource to obtain, based on the approval requisition, the approval to access the first resource (operation 814). In one example, traversing the approval workflow corresponding to the first resource includes determining a network address of an approval service corresponding to the first resource based on an approval service identifier associated with the first resource and transmitting the approval requisition to the network address of the approval service. The approval service corresponding to the first resource receives the approval requisition, and responsive to receiving the approval requisition, the approval service executes a set of one or more approval workflow operations to determine that the access agent is approved to access the first resource. The set of one or more approval workflow operations may include one or more operations described in the '558 Application.

In one example, the first resource includes a service component associated with a cloud service, and the second resource includes a customer-facing component of the cloud service. Additionally, or alternatively, the first resource may be located in a first compartment associated with a cloud operator, and the second resource may be located in a second compartment associated with a customer. In one example, the customer-facing component of the cloud service may utilize a plurality of service components, and the respective service components may be accessed by submitting separate approval requisitions and obtaining separate approvals in response to the separate approval requisitions.

8. MISCELLANEOUS; EXTENSIONS

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein

What is claimed is:

1. One or more non-transitory computer-readable media storing instructions that, when executed by one or more hardware processors, cause performance of operations comprising:

receiving, at an access control service of a computing environment, from a first computer-executed access agent, a first approval request associated with a first resource of the computing environment for the access control service to request a first approval for the first computer-executed access agent to access the first resource;

determining, based on a first dependency attribute associated with the first resource, a first resource dependency between the first resource and a second resource of the computing environment;

generating, based at least in part on the first resource dependency between the first resource and the second resource of the computing environment, a first approval requisition for requesting the first approval to access the first resource of the computing environment based on a first approval workflow corresponding to obtaining access to the second resource of the computing environment;

wherein the first approval workflow corresponding to the second resource is executed in the computing environment, based on the first approval requisition, to obtain the first approval to access the first resource;

wherein the first computer-executed access agent accesses the first resource based at least in part on the first approval obtained by executing of the first approval workflow corresponding to the second resource.

2. The one or more non-transitory computer-readable media of claim 1, wherein generating the first approval requisition comprises:

determining a resource identifier corresponding to the first resource and an approval service identifier of an approval service corresponding to the second resource, populating the first approval requisition with the resource identifier corresponding to the first resource and the approval service identifier corresponding to the second resource.

3. The one or more non-transitory computer-readable media of claim 1, wherein the operations further comprise:

subsequent to determining the first resource dependency between the first resource and the second resource: validating that the first computer-executed access agent associated with the first resource is authorized to submit the first approval request based on a set of one or more permissions associated with the second resource.

4. The one or more non-transitory computer-readable media of claim 1, wherein the operations further comprise:

receiving, from an approval service, an approval confirmation comprising the first approval to access the first resource;

determining, based on the approval confirmation, that the first approval is for the first computer-executed access agent to access the first resource; and responsive to determining that the first approval is for the first computer-executed access agent to access the first resource: transmitting an approval notification comprising the first approval to at least one of: the first computer-executed access agent, or a resource service corresponding to the first resource.

5. The one or more non-transitory computer-readable media of claim 4, wherein determining that the first approval is for the first computer-executed access agent to access the first resource comprises:

accessing a second dependency attribute associated with the approval confirmation;

determining, based on the second dependency attribute, a resource identifier corresponding to the first resource;

determining, based on the resource identifier corresponding to the first resource, that the first approval is for the first computer-executed access agent to access the first resource.

6. The one or more non-transitory computer-readable media of claim 1, wherein the operations further comprise:

transmitting to the first computer-executed access agent, a first approval notification comprising the first approval;

wherein responsive at least to the first computer-executed access agent receiving the first approval notification, prior to the first computer-executed access agent accessing the first resource, the first computer-executed access agent obtains a credential for accessing the first resource, and wherein the first computer-executed access agent utilizes the credential to access the first resource.

7. The one or more non-transitory computer-readable media of claim 1, wherein the operations further comprise:

transmitting to a resource service corresponding to the first resource, a first approval notification comprising the first approval, wherein the resource service stores the first approval in an approval data corpus corresponding to the first resource;

receiving, at the access control service from the first computer-executed access agent, a credential request for the access control service to generate a credential for the first computer-executed access agent to access the first resource;

transmitting an approval inquiry to the resource service, wherein the resource service determines, based at least in part on the first approval in the approval data corpus, that the first computer-executed access agent is approved to access the first resource;

receiving an approval confirmation from the resource service indicating that the access control service is approved to generate the credential;

generating the credential;

transmitting the credential to the first computer-executed access agent, wherein the first computer-executed access agent utilizes the credential to access the first resource.

8. The one or more non-transitory computer-readable media of claim 1, wherein traversing the first approval workflow corresponding to the second resource to obtain the first approval to access the first resource comprises:

determining a network address of an approval service corresponding to the second resource based on an approval service identifier associated with the second resource; and transmitting the first approval requisition to the network address of the approval service corresponding to the second resource;

wherein the approval service corresponding to the second resource receives the first approval requisition, wherein responsive to receiving the first approval requisition, the approval service executes a set of one or more approval workflow operations to determine that the first computer-executed access agent is approved to access the first resource, wherein responsive to determining that the first computer-executed access agent is approved to access the first resource, the approval service transmits to the access control service, a first approval confirmation comprising the first approval.

9. The one or more non-transitory computer-readable media of claim 8, wherein the set of one or more approval workflow operations comprises:

requesting approval from a set of one or more approvers associated with the second resource for the first computer-executed access agent to access the first resource.

10. The one or more non-transitory computer-readable media of claim 1, wherein determining the first resource dependency between the first resource and the second resource comprises:

accessing the first dependency attribute associated with the first resource, and determining that the first dependency attribute comprises an approval service identifier corresponding to the second resource.

11. The one or more non-transitory computer-readable media of claim 10, wherein the first dependency attribute is stored in metadata associated with the first resource.

12. The one or more non-transitory computer-readable media of claim 1, receiving, at the access control service from a second computer-executed access agent, a second approval request associated with a third resource for the access control service to request a second approval for the second computer-executed access agent to access the third resource;

determining, based on a second dependency attribute associated with the third resource, that the third resource is independent;

generating, based at least in part on the third resource being independent, a second approval requisition for requesting the second approval to access the third resource based on a second approval workflow corresponding to the third resource;

traversing the second approval workflow corresponding to the third resource to obtain, based on the second approval requisition, the second approval to access the third resource;

wherein the second computer-executed access agent accesses the third resource based at least in part on the second approval.

13. The one or more non-transitory computer-readable media of claim 12, wherein determining that the third resource is independent comprises:

accessing the second dependency attribute associated with the second resource, and determining that the second dependency attribute comprises a second approval service identifier, and (a) the second approval service identifier comprises a null value, or (b) a second approval service corresponding to the third resource is identified by the second approval service identifier.

14. The one or more non-transitory computer-readable media of claim 12, wherein the operations further comprise:

receiving, from a second approval service, an approval confirmation comprising the second approval to access the third resource;

determining, based on the approval confirmation, that the third resource is independent; and responsive to determining that the third resource is independent: transmitting an approval notification comprising the second approval to at least one of: the second computer-executed access agent, or a resource service corresponding to the third resource.

15. The one or more non-transitory computer-readable media of claim 14, wherein determining that the third resource is independent comprises:

accessing the second dependency attribute via the approval confirmation;

determining, based on the second dependency attribute, a resource identifier corresponding to the third resource;

determining, based on the resource identifier corresponding to the third resource, that the third resource is independent.

16. The one or more non-transitory computer-readable media of claim 1, wherein the first resource is located in a first compartment associated with a cloud operator and the second resource is located in a second compartment associated with a customer.

17. The one or more non-transitory computer-readable media of claim 1, wherein the operations further comprise:

receiving, at the access control service from a second computer-executed access agent, a second approval request associated with a third resource for the access control service to request a second approval for the second computer-executed access agent to access the third resource;

determining, based on a second dependency attribute associated with the second resource, a second resource dependency between the third resource and the second resource, wherein the third resource is a dependent resource with respect to the second resource;

generating, based at least in part on the second resource dependency between the third resource and the second resource, a second approval requisition for requesting the second approval to access the third resource based on the first approval workflow corresponding to the second resource;

traversing the first approval workflow corresponding to the second resource to obtain, based on the second approval requisition, the second approval to access the third resource;

wherein the second computer-executed access agent accesses the third resource based at least in part on the second approval;

wherein the first resource comprises a first service component associated with a cloud service, wherein the second resource comprises a customer-facing component of the cloud service, wherein the third resource comprises a second service component associated with the cloud service, wherein the customer-facing component of the cloud service utilizes the first service component and the second service component.

18. The one or more non-transitory computer-readable media of claim 1, wherein the operations further comprise:

identifying the first approval workflow corresponding to the second resource based on the first approval requisition;

traversing the first approval workflow corresponding to the second resource to obtain the first approval to access the first resource.

19. A method, comprising:

receiving, at an access control service of a computing environment, from a first computer-executed access agent, a first approval request associated with a first resource of the computing environment for the access control service to request a first approval for the first computer-executed access agent to access the first resource;

determining, based on a first dependency attribute associated with the first resource, a first resource dependency between the first resource and a second resource of the computing environment;

generating, based at least in part on the first resource dependency between the first resource and the second resource of the computing environment, a first approval requisition for requesting the first approval to access the first resource of the computing environment based on a first approval workflow corresponding to obtaining access to the second resource of the computing environment;

wherein the first approval workflow corresponding to the second resource is executed in the computing environment, based on the first approval requisition, to obtain the first approval to access the first resource;

wherein the first computer-executed access agent accesses the first resource based at least in part on the first approval obtained by executing of the first approval workflow corresponding to the second resource;

wherein the method is performed by at least one device including a hardware processor.

20. A system, comprising:

at least one hardware processor;

wherein the system is configured to execute operations, using the at least one hardware processor, the operations comprising:

receiving, at an access control service of a computing environment, from a first computer-executed access agent, a first approval request associated with a first resource of the computing environment for the access control service to request a first approval for the first computer-executed access agent to access the first resource;

determining, based on a first dependency attribute associated with the first resource, a first resource dependency between the first resource and a second resource of the computing environment;

generating, based at least in part on the first resource dependency between the first resource and the second resource of the computing environment, a first approval requisition for requesting the first approval to access the first resource of the computing environment based on a first approval workflow corresponding to obtaining access to the second resource of the computing environment;

wherein the first approval workflow corresponding to the second resource is executed in the computing environment, based on the first approval requisition, to obtain the first approval to access the first resource;

wherein the first computer-executed access agent accesses the first resource based at least in part on the first approval obtained by executing of the first approval workflow corresponding to the second resource.

* * * * *